United States Patent
Kuhn et al.

[11] Patent Number: 6,141,644
[45] Date of Patent: Oct. 31, 2000

[54] SPEAKER VERIFICATION AND SPEAKER IDENTIFICATION BASED ON EIGENVOICES

[75] Inventors: Roland Kuhn, Santa Barbara; Patrick Nguyen, Isla Vista; Jean-Claude Junqua, Santa Barbara; Robert Boman, Thousand Oaks, all of Calif.

[73] Assignee: Matsushita Electric Industrial Co., Ltd., Osaka, Japan

[21] Appl. No.: 09/148,911

[22] Filed: Sep. 4, 1998

[51] Int. Cl.[7] .............................. G10L 15/10; G10L 15/14
[52] U.S. Cl. ........................ 704/273; 704/238; 704/240; 704/246; 704/270
[58] Field of Search ...................... 704/238, 240, 704/243, 272, 246, 250, 270, 273, 236

[56] References Cited

U.S. PATENT DOCUMENTS

| | | | |
|---|---|---|---|
| 4,032,711 | 6/1977 | Sambur | 704/246 |
| 5,054,083 | 10/1991 | Naik et al. | 704/272 |
| 5,345,535 | 9/1994 | Doddington | 704/236 |
| 5,469,529 | 11/1995 | Bimbot et al. | 704/246 |
| 5,548,647 | 8/1996 | Naik et al. | 704/200 |
| 5,632,002 | 5/1997 | Hashimoto et al. | 704/231 |
| 5,687,287 | 11/1997 | Gandhi et al. | 704/247 |

*Primary Examiner*—David R. Hudspeth
*Assistant Examiner*—Nijay Chawan
*Attorney, Agent, or Firm*—Harness, Dickey & Pierce, P.L.C.

[57] ABSTRACT

Speech models are constructed and trained upon the speech of known client speakers (and also impostor speakers, in the case of speaker verification). Parameters from these models are concatenated to define supervectors and a linear transformation upon these supervectors results in a dimensionality reduction yielding a low-dimensional space called eigenspace. The training speakers are then represented as points or distributions in eigenspace. Thereafter, new speech data from the test speaker is placed into eigenspace through a similar linear transformation and the proximity in eigenspace of the test speaker to the training speakers serves to authenticate or identify the test speaker.

11 Claims, 6 Drawing Sheets

SPEAKER VERIFICATION AND SPEAKER IDENTIFICATION BASED ON EIGENVOICES

BACKGROUND AND SUMMARY OF THE INVENTION

The present invention relates generally to speech technology and, more particularly, to a system and method for performing speaker verification or speaker identification.

The problem of authentication lies at the heart of nearly every transaction. Millions of people conduct confidential financial transactions over the telephone, such as accessing their bank accounts or using their credit cards. Authentication under current practice is far from foolproof. The parties exchange some form of presumably secret information, such as social security number, mother's maiden name or the like. Clearly, such information can be pirated, resulting in a false authentication.

One aspect of the present invention addresses the foregoing problem by providing a system and method for performing speaker verification. Speaker verification involves determining whether a given voice belongs to a certain speaker (herein called the "client") or to an impostor (anyone other than the client).

Somewhat related to the problem of speaker verification is the problem of speaker identification. Speaker identification involves matching a given voice to one of a set of known voices. Like speaker verification, speaker identification has a number of attractive applications. For example, a speaker identification system may be used to classify voice mail by speaker for a set of speakers for which voice samples are available. Such capability would allow a computer-implemented telephony system to display on a computer screen the identity of callers who have left messages on the voice mail system.

While the applications for speaker verification and speaker identification are virtually endless, the solution to performing these two tasks has heretofore proven elusive. Recognizing human speech and particularly discriminating the speaker from other speakers is a complex problem. Rarely does a person speak even a single word the same way twice due to how human speech is produced.

Human speech is the product of air under pressure from the lungs being forced through the vocal cords and modulated by the glottis to produce sound waves that then resonate in the oral and nasal cavities before being articulated by the tongue, jaw, teeth and lips. Many factors affect how these sound producing mechanisms inter-operate. The common cold, for example, greatly alters the resonance of the nasal cavity as well as the tonal quality of the vocal cords.

Given the complexity and variability with which the human produces speech, speaker verification and speaker identification are not readily performed by comparing new speech with a previously recorded speech sample. Employing a high similarity threshold, to exclude impostors, may exclude the authentic speaker when he or she has a head cold. On the other hand, employing a low similarity threshold can make the system prone to false verification.

The present invention uses a model-based analytical approach to speaker verification and speaker identification. Models are constructed and trained upon the speech of known client speakers (and in the case of speaker verification also upon the speech of one or more impostors). These speaker models typically employ a multiplicity of parameters (such as Hidden Markov Model parameters). Rather than using these parameters directly, the parameters are concatenated to form supervectors. These supervectors, one supervector per speaker, represent the entire training data speaker population.

A linear transformation is performed on the supervectors resulting in a dimensionality reduction that yields a low-dimensional space that we call eigenspace. The basis vectors of this eigenspace we call "eigenvoice" vectors or "eigenvectors". If desired, the eigenspace can be further dimensionally reduced by discarding some of the eigenvector terms.

Next, each of the speakers comprising the training data is represented in eigenspace, either as a point in eigenspace or as a probability distribution in eigenspace. The former is somewhat less precise in that it treats the speech from each speaker as relatively unchanging. The latter reflects that the speech of each speaker will vary from utterance to utterance.

Having represented the training data for each speaker in eigenspace, the system may then be used to perform speaker verification or speaker identification.

New speech data is obtained and used to construct a supervector that is then dimensionally reduced and represented in the eigenspace. Assessing the proximity of the new speech data to prior data in eigenspace, speaker verification or speaker identification is performed. The new speech from the speaker is verified if its corresponding point or distribution within eigenspace is within a threshold proximity to the training data for that client speaker. The system may reject the new speech as authentic if it falls closer to an impostor's speech when placed in eigenspace.

Speaker identification is performed in a similar fashion. The new speech data is placed in eigenspace and identified with that training speaker whose eigenvector point for distribution is closest.

Assessing proximity between the new speech data and the training data in eigenspace has a number of advantages. First, the eigenspace represents in a concise, low-dimensionality way, each entire speaker, not merely a selected few features of each speaker. Proximity computations performed in eigenspace can be made quite rapidly as there are typically considerably fewer dimensions to contend with in eigenspace than there are in the original speaker model space or feature vector space. Also, the system does not require that the new speech data include each and every example or utterance that was used to construct the original training data. Through techniques described herein, it is possible to perform dimensionality reduction on a supervector for which some of its components are missing. The result point for distribution in eigenspace nevertheless will represent the speaker remarkably well.

For a more complete understanding of the invention, its objects and advantages, refer to the following specification and to the accompanying drawings.

DESCRIPTION OF THE PREFERRED EMBODIMENTS

The eigenvoice techniques employed by the present invention will work with many different speech models. We illustrate the preferred embodiment in connection with a Hidden Markov Model recognizer because of its popularity in speech recognition technology today. However, it should be understood that the invention can be practiced using other types of model-based recognizers, such as phoneme similarity recognizers, for example.

To better understand the speaker identification and verification techniques of the invention, a basic understanding of speech recognition systems will be helpful. Inasmuch as most present day speech recognizers employ Hidden Markov Models (HMMs) to represent speech, the HMM technology will be described here to familiarize the reader.

The Hidden Markov Model is a modeling approach involving state diagrams. Any speech unit (such as a phrase, word, subword, phoneme or the like) can be modeled, with all knowledge sources included in that model. The HMM represents an unknown process that produces a sequence of observable outputs at discrete intervals, the outputs being members of some finite alphabet (corresponding to the predefined set of speech units). These models are called "hidden" because the state sequence that produced the observable output is not known.

Figure 1:
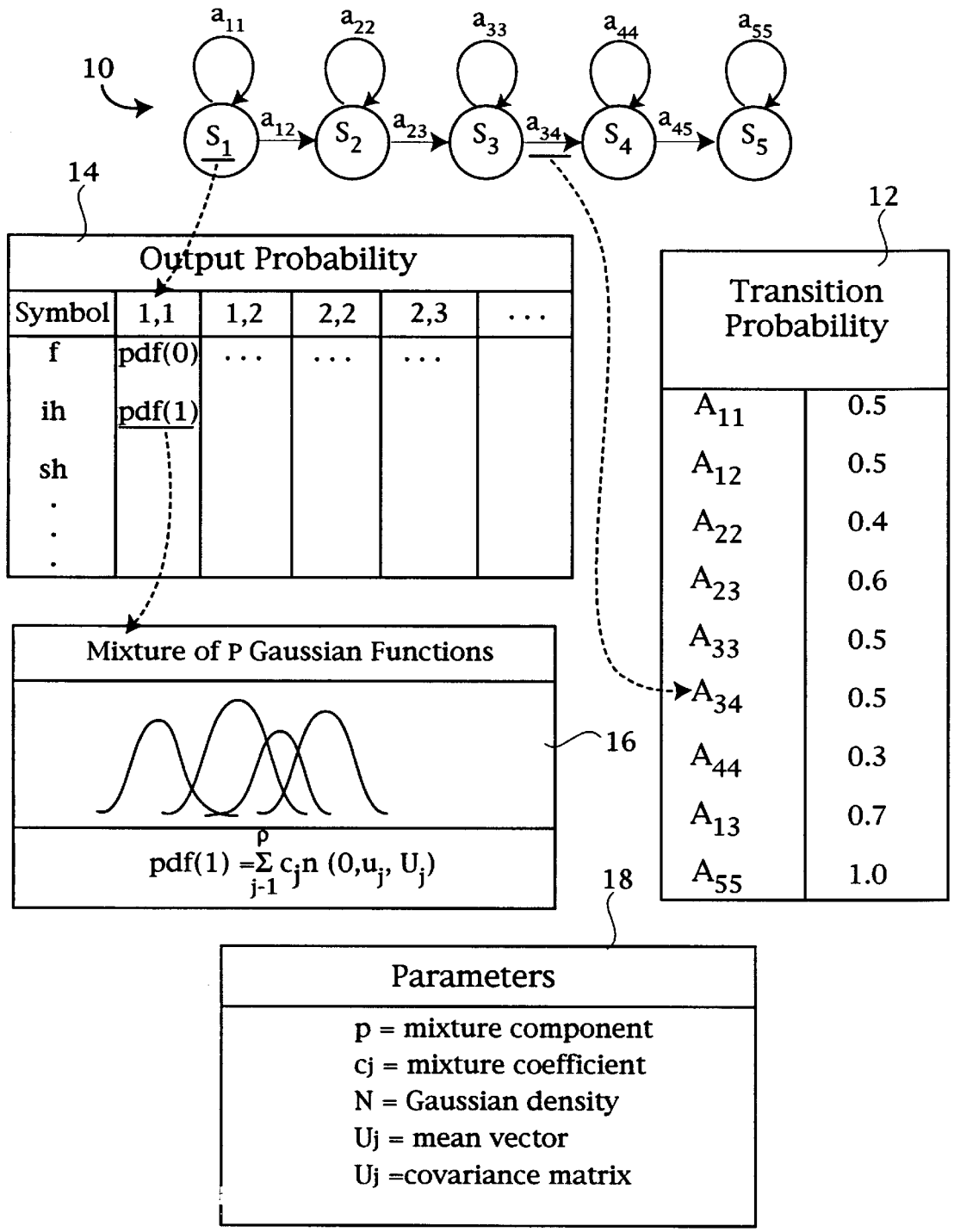
FIG. 1 illustrates an exemplary Hidden Markov Model (HMM), useful in understanding the invention.

As illustrated in FIG. 1, an HMM 10 is illustrated by a set of states (S1, S2 ... S5), vectors that define transitions between certain pairs of states, illustrated as arrows in FIG. 1, and a collection of probability data. Specifically, the Hidden Markov Model includes a set of transition probabilities 12 associated with the transition vectors and a set of output probabilities 14 associated with the observed output at each state. The model is clocked from one state to another at regularly spaced, discrete intervals. At clock-time, the model may change from its current state to any state for which a transition vector exists. As illustrated, a transition can be from a given state back to itself.

The transition probabilities represent the likelihood that a transition from one state to another will occur when the model is clocked. Thus, as illustrated in FIG. 1, each transition has associated with it a probability value (between 0 and 1). The sum of all probabilities leaving any state equals 1. For illustration purposes, a set of exemplary transition probability values has been given in transition probability Table 12. It will be understood that in a working embodiment these values would be generated by the training data, with the constraint that the sum of all probabilities leaving any state equals 1.

Every time a transition is taken, the model can be thought of as emitting or outputting one member of its alphabet. In the embodiment illustrated in FIG. 1, a phoneme-based speech unit has been assumed. Thus the symbols identified in output probability Table 14 correspond to some of the phonemes found in standard English. Which member of the alphabet gets emitted upon each transition depends on the output probability value or function learned during training.

The outputs emitted thus represent a sequence of observations (based on the training data) and each member of the alphabet has a probability of being emitted.

In modeling speech, it is common practice to treat the output as a sequence of continuous vectors as opposed to a sequence of discrete alphabet symbols. This requires the output probabilities to be expressed as continuous probability functions, as opposed to single numeric values. Thus HMMs are often based on probability functions comprising one or more Gaussian distributions. When a plurality of Gaussian functions are used they are typically additively mixed together to define a complex probability distribution, as illustrated at 16.

Whether represented as a single Gaussian function or a mixture of Gaussian functions, the probability distributions can be described by a plurality of parameters. Like the transition probability values (Table 12) these output probability parameters may comprise floating point numbers. Parameters Table 18 identifies the parameters typically used to represent probability density functions (pdf) based on observed data from the training speakers. As illustrated by the equation in FIG. 1 at Gaussian function 16, the probability density function for an observation vector O to be modeled is the iterative sum of the mixture coefficient for each mixture component multiplied by the Gaussian density n, where the Gaussian density has a mean vector $u_j$ and covariance matrix $U_j$ computed from the cepstral or filter bank coefficient speech parameters.

The implementation details of a Hidden Markov Model recognizer may vary widely from one application to another. The HMM example shown in FIG. 1 is intended merely to illustrate how Hidden Markov Models are constructed, and is not intended as a limitation upon the scope of the present invention. In this regard, there are many variations on the Hidden Markov Modeling concept. As will be more fully understood from the description below, the eigenvoice adaptation technique of the invention can be readily adapted to work with each of the different Hidden Markov Model variations, as well as with other parameter-based speech modeling systems.

Figure 2:
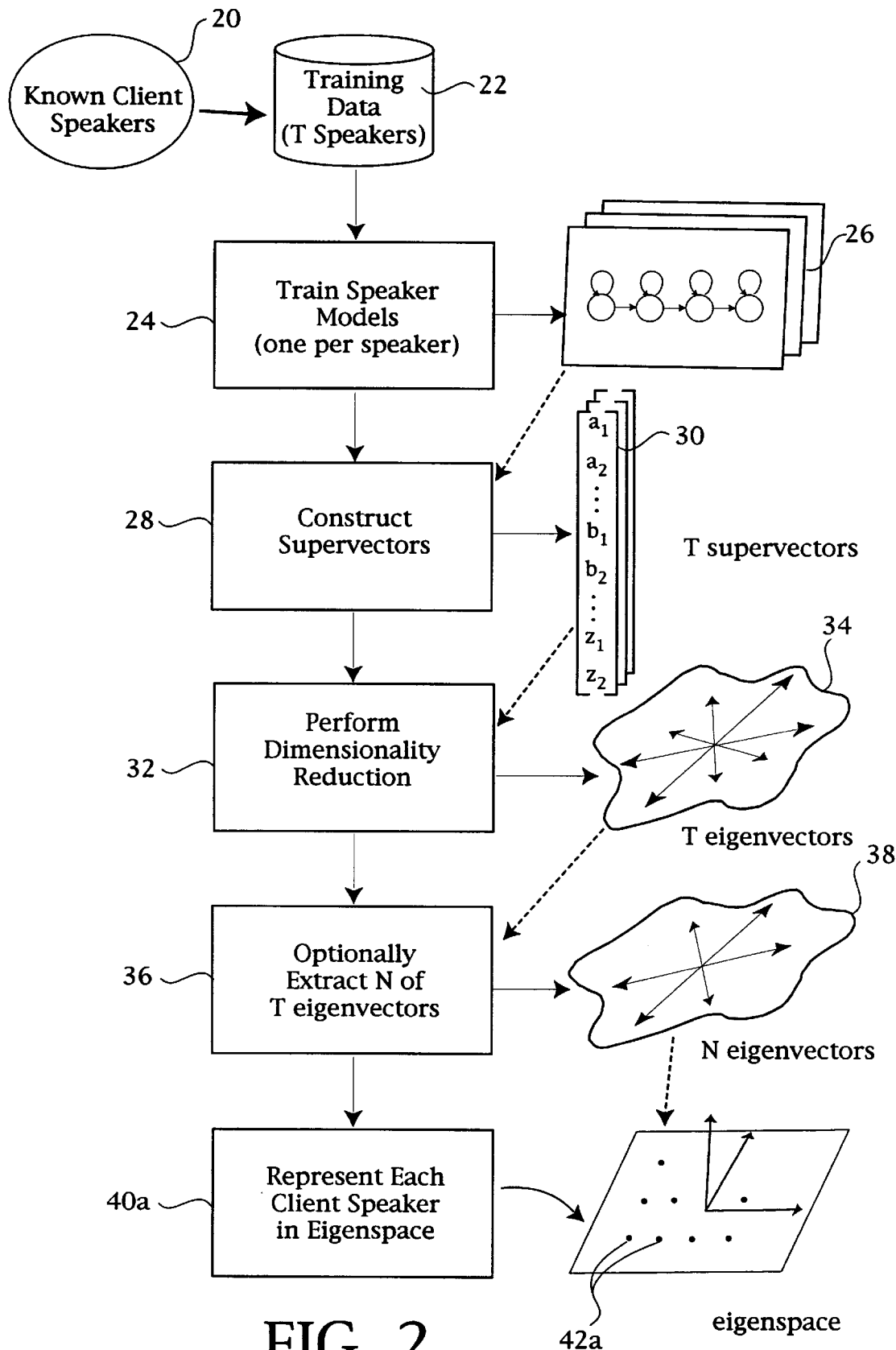
FIG. 2 is a flow diagram showing how the eigenspace may be constructed to implement a speaker identification system, where known client speakers are represented as points in eigenspace.
Figure 3:
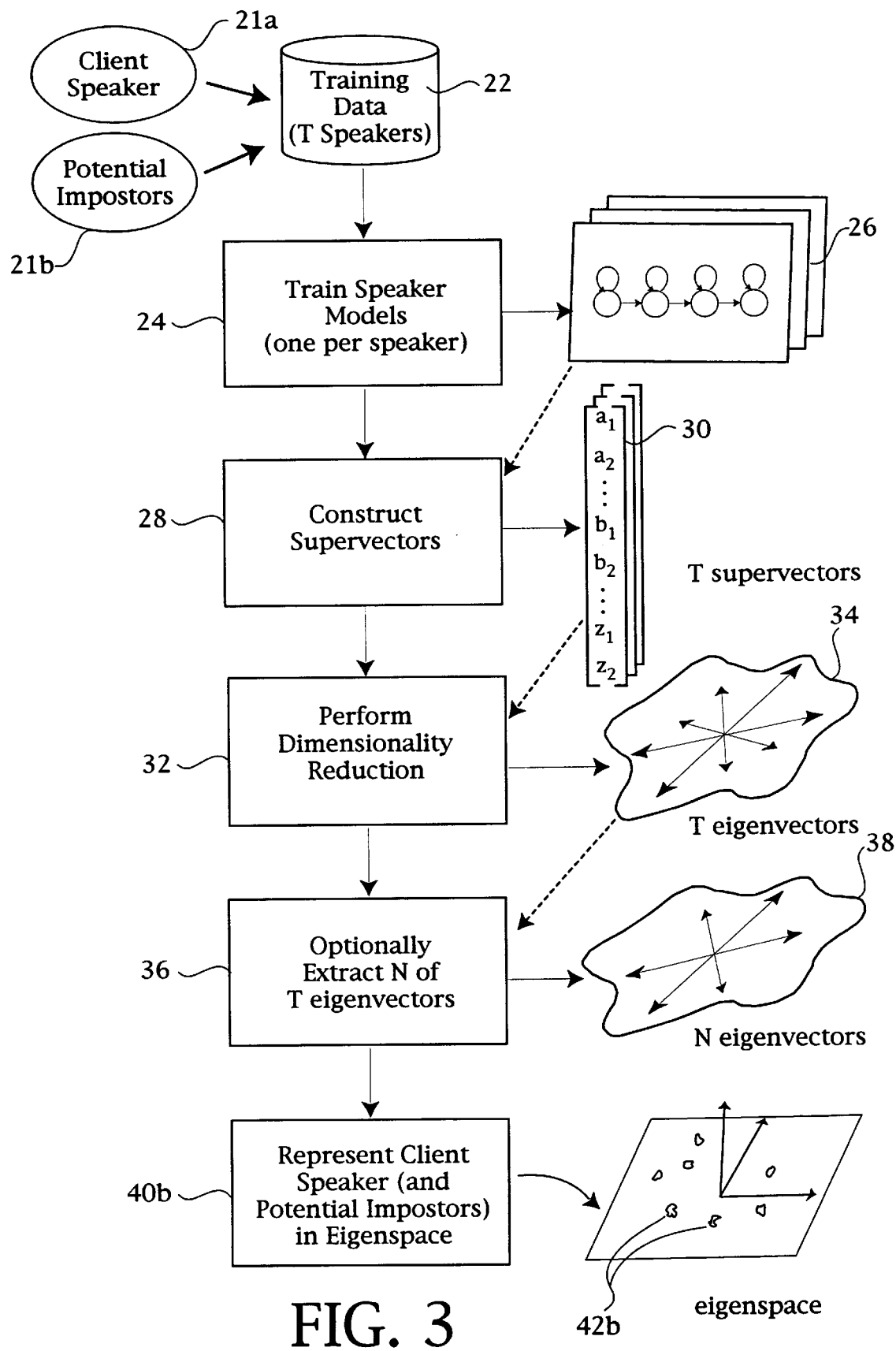
FIG. 3 is a flow diagram illustrating how the eigenspace may be constructed to implement a speaker verification system, where the client speaker and potential impostors are represented as distributions in eigenspace.

FIGS. 2 and 3 illustrate, respectively, how speaker identification and speaker verification may be performed using the techniques of the invention. As a first step in performing either speaker identification or speaker verification, an eigenspace is constructed. The specific eigenspace constructed depends upon the application. In the case of speaker identification, illustrated in FIG. 2, a set of known client speakers is used to supply training data 22 upon which the eigenspace is created. Alternatively, for speaker verification, shown in FIG. 3, the training data 22 are supplied from the client speaker or speakers 21a for which verification will be desired and also from one or more potential impostors 21b. Aside from this difference in training data source, the procedure for generating the eigenspace is essentially the same for both speaker identification and speaker verification applications. Accordingly, like reference numerals have been applied to FIGS. 2 and 3.

Referring to FIGS. 2 and 3, the eigenspace is constructed by developing and training speaker models for each of the speakers represented in the training data 22. This step is illustrated at 24 and generates a set of models 26 for each speaker. Although Hidden Markov Models have been illustrated here, the invention is not restricted to Hidden Markov Models. Rather, any speech model having parameters suitable for concatenation may be used. Preferably, the models 26 are trained with sufficient training data so that all sound units defined by the model are trained by at least one instance of actual speech for each speaker. Although not illustrated explicitly in FIGS. 2 and 3, the model training step 24 can include appropriate auxiliary speaker adaptation processing to refine the models. Examples of such auxiliary processing include Maximum A Posteriori estimation (MAP) or other transformation-based approaches such as Maximum Likelihood Linear Regression (MLLR). The objective in creating the speaker models 26 is to accurately represent the training data corpus, as this corpus is used to define the metes and bounds of the eigenspace into which each training speaker is placed and with respect to which each new speech utterance is tested.

After constructing the models 26, the models for each speaker are used to construct a supervector at step 28. The supervector, illustrated at 30, may be formed by concatenating the parameters of the model for each speaker. Where Hidden Markov Models are used, the supervector for each speaker may comprise an ordered list of parameters (typically floating point numbers) corresponding to at least a portion of the parameters of the Hidden Markov Models for that speaker. Parameters corresponding to each sound unit are included in the supervector for a given speaker. The parameters may be organized in any convenient order. The order is not critical; however, once an order is adopted it must be followed for all training speakers.

The choice of model parameters to use in constructing the supervector will depend on the available processing power of the computer system. When using Hidden Markov Model parameters, we have achieved good results by constructing supervectors from the Gaussian means. If greater processing power is available, the supervectors may also include other parameters, such as the transition probabilities (Table 12, FIG. 1) or the Covariance Matrix parameters (parameters 18, FIG. 1). If the Hidden Markov Models generate discrete outputs (as opposed to probability densities), then these output values may be used to comprise the supervector.

After constructing the supervectors a dimensionality reduction operation is performed at step 32. Dimensionality reduction can be effected through any linear transformation that reduces the original high-dimensional supervectors into basis vectors. A non-exhaustive list of examples includes:

Principal Component Analysis (PCA), Independent Component Analysis (ICA), Linear Discriminant Analysis (LDA)), Factor Analysis (FA), and Singular Value Decomposition (SVD).

More specifically, the class of dimensionality reduction techniques useful in implementing the invention is defined as follows. Consider a set of T training supervectors obtained from speaker-dependent models for speech recognition. Let each of these supervectors have dimension V; thus, we can denote every supervector as $X=[x1, x2, \ldots, xV]^T$ (a V*1 vector). Consider a linear transformation M that can be applied to a supervector (i.e. to any vector of dimension V) to yield a new vector of dimension E (E is less than or equal to T, the number of training supervectors); each transformed vector can be denoted $W=[w1, w2, \ldots, wE]^T$. The values of the parameters of M are calculated in some way from the set of T training supervectors.

Thus, we have the linear transformation $W=M*X$. M has dimension E*V, and W has dimension E*1, where E<=T; for a particular set of T training supervectors, M will be constant. Several dimensionality reduction techniques may be used to calculate a linear transformation M from a set of T training supervectors such that W has dimension E<=T.

Examples include Principal Component Analysis, Independent Component Analysis, Linear Discriminant Analysis, Factor Analysis, and Singular Value Decomposition. The invention may be implemented with any such method (not only those listed) for finding such a constant linear transformation M in the special case where the input vectors are training supervectors derived from speaker-dependent modeling, and where M is used to carry out the aforementioned technique.

The basis vectors generated at step 32 define an eigenspace spanned by the eigenvectors. Dimensionality reduction yields one eigenvector for each one of the training speakers. Thus if there are T training speakers then the dimensionality reduction step 32 produces T eigenvectors. These eigenvectors define what we call eigenvoice space or eigenspace.

The eigenvectors that make up the eigenvoice space, illustrated at 34, each represent a different dimension across which different speakers may be differentiated. Each supervector in the original training set can be represented as a linear combination of these eigenvectors. The eigenvectors are ordered by their importance in modeling the data: the first eigenvector is more important than the second, which is more important than the third, and so on. Our experiments with this technique thus far show that the first eigenvector appears to correspond to a male-female dimension.

Although a maximum of T eigenvectors is produced at step 32, in practice, it is possible to discard several of these eigenvectors, keeping only the first N eigenvectors. Thus at step 36 we optionally extract N of the T eigenvectors to comprise a reduced parameter eigenspace at 38. The higher order eigenvectors can be discarded because they typically contain less important information with which to discriminate among speakers. Reducing the eigenvoice space to fewer than the total number of training speakers provides an inherent data compression that can be helpful when constructing practical systems with limited memory and processor resources.

After generating the eigenvectors from the training data each speaker in the training data is represented in eigenspace. In the case of speaker identification, each known client speaker is represented in eigenspace as depicted at step 40*a* and illustrated diagrammatically at 42*a*. In the case of speaker verification, the client speaker and potential impostor speakers are represented in eigenspace as indicated at step 40*b* and as illustrated at 42*b*. The speakers may be represented in eigenspace either as points in eigenspace (as illustrated diagrammatically in FIG. 2 at 42*a*) or as probability distributions in eigenspace (as illustrated diagrammatically in FIG. 3 at 42*b*).

Using the Speaker Identification or Speaker Verification System

The user seeking speaker identification or verification supplies new speech data at 44 and these data are used to train a speaker dependent model as indicated at step 46. The model 48 is then used at step 50 to construct a supervector 52. Note that the new speech data may not necessarily include an example of each sound unit. For instance, the new speech utterance may be too short to contain examples of all sound units. The system will handle this, as will be more fully explained below.

Dimensionality reduction is performed at step 54 upon the supervector 52, resulting in a new data point that can be represented in eigenspace as indicated at step 56 and illustrated at 58. In the illustration at 58 the previously acquired points in eigenspace (based on training speakers) are represented as dots, whereas the new speech data point is represented by a star.

Figure 4:
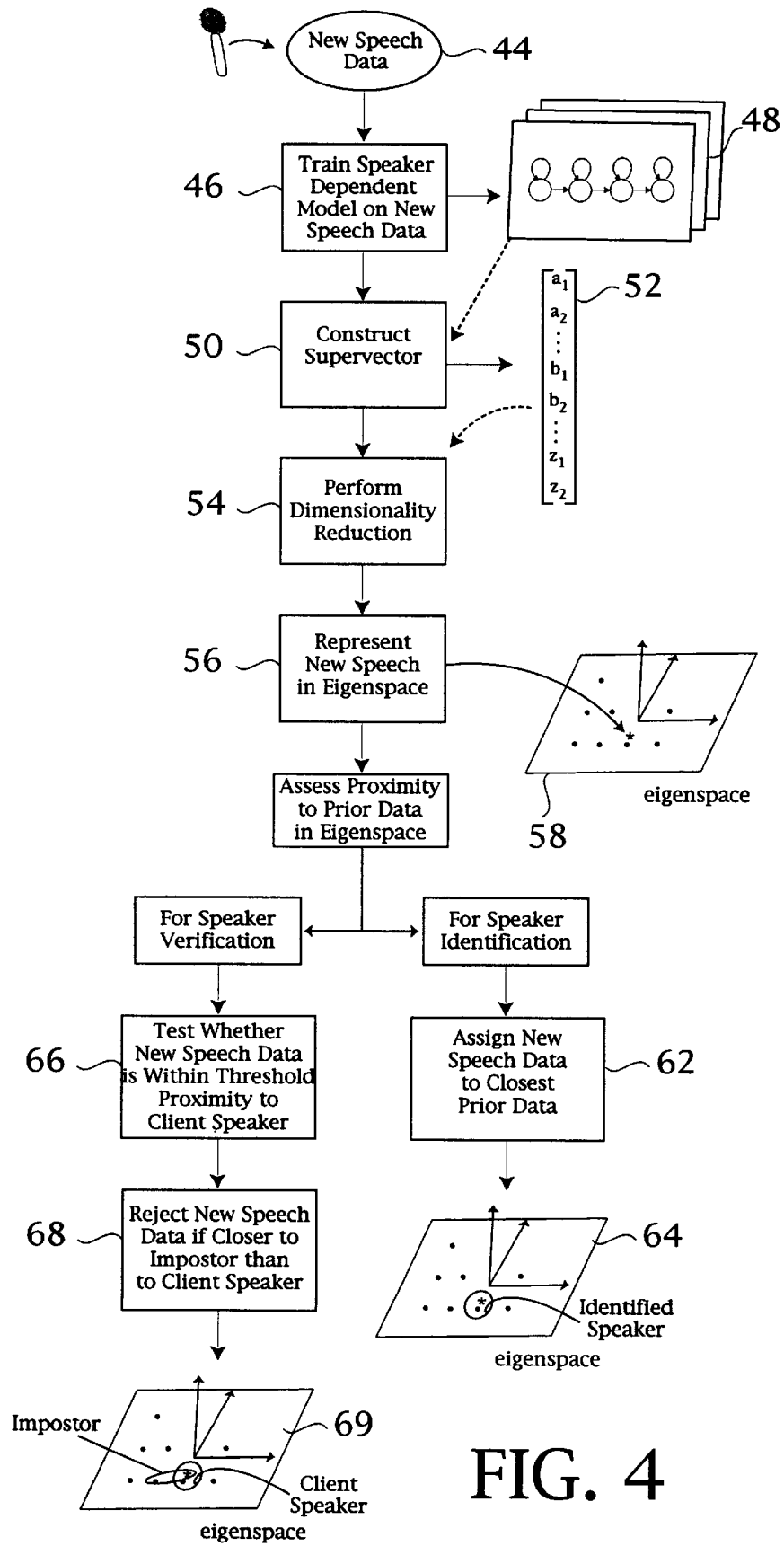
FIG. 4 is a flow diagram illustrating the process by which either speaker identification or speaker verification may be performed using the eigenspace developed during training.

Having placed the new data point in eigenspace, it may now be assessed with respect to its proximity to the other prior data points or data distributions corresponding to the training speakers. FIG. 4 illustrates an exemplary embodiment of both speaker identification and speaker verification.

For speaker identification, the new speech data is assigned to the closest training speaker in eigenspace, step 62 diagrammatically illustrated at 64. The system will thus identify the new speech as being that of the prior training speaker whose data point or data distribution lies closest to the new speech in eigenspace.

For speaker verification, the system tests the new data point at step 66 to determine whether it is within a predetermined threshold proximity to the client speaker in eigenspace. As a safeguard the system may, at step 68, reject the new speaker data if it lies closer in eigenspace to an impostor than to the client speaker. This is diagrammatically illustrated at 69, where the proximity to the client speaker and proximity to the closest impostor have been depicted.

The Maximum Likelihood Eigenspace Decomposition (MLED) Technique

One simple technique for placing the new speaker within eigenspace is to use a simple projection operation. A projection operation finds the point within eigenspace that is as close as possible to the point outside of eigenspace corresponding to the new speaker's input speech. It bears noting that these points are actually supervectors from which a set of HMMs can be reconstituted.

The projection operation is a comparatively crude technique that does not guarantee that the point within eigenspace is optimal for the new speaker. Furthermore, the projection operation requires that the supervector for the new speaker contain a complete set of data to represent the entire set of HMMs for that speaker. This requirement gives rise to a significant practical limitation. When using projection to constrain a new speaker to the eigenspace, that speaker must supply enough input speech so that all speech units are represented in the data. For example, if the Hidden Markov Models are designed to represent all phonemes in the English language, then the training speaker must supply examples of all phonemes before the simple projection technique can be used. In many applications this constraint is simply not practical.

The maximum likelihood technique of the invention addresses both of the above-mentioned drawbacks of simple projection. The maximum likelihood technique of the invention finds a point within eigenspace that represents the supervector corresponding to a set of Hidden Markov Models that have the maximum probability of generating the speech supplied by the new speaker.

Whereas the simple projection operation treats all members of the supervector as having equal importance, the maximum likelihood technique is based on probabilities arising from the actual adaptation data and thus tends to weight the more probable data more heavily. Unlike the simple projection technique, the maximum likelihood technique will work even if the new speaker has not supplied a full set of training data (i.e., data for some of the sound units are missing). In effect, the maximum likelihood technique takes into account the context under which the supervectors are constructed, namely from Hidden Markov Models involving probabilities that certain models are more likely than others to generate the input speech supplied by the new speaker.

In practical effect, the maximum likelihood technique will select the supervector within eigenspace that is the most consistent with the new speaker's input speech, regardless of how much input speech is actually available. To illustrate, assume that the new speaker is a young female native of Alabama. Upon receipt of a few uttered syllables from this speaker, the maximum likelihood technique will select a point within eigenspace that represents all phonemes (even those not yet represented in the input speech) consistent with this speaker's native Alabama female accent.

Figure 5:
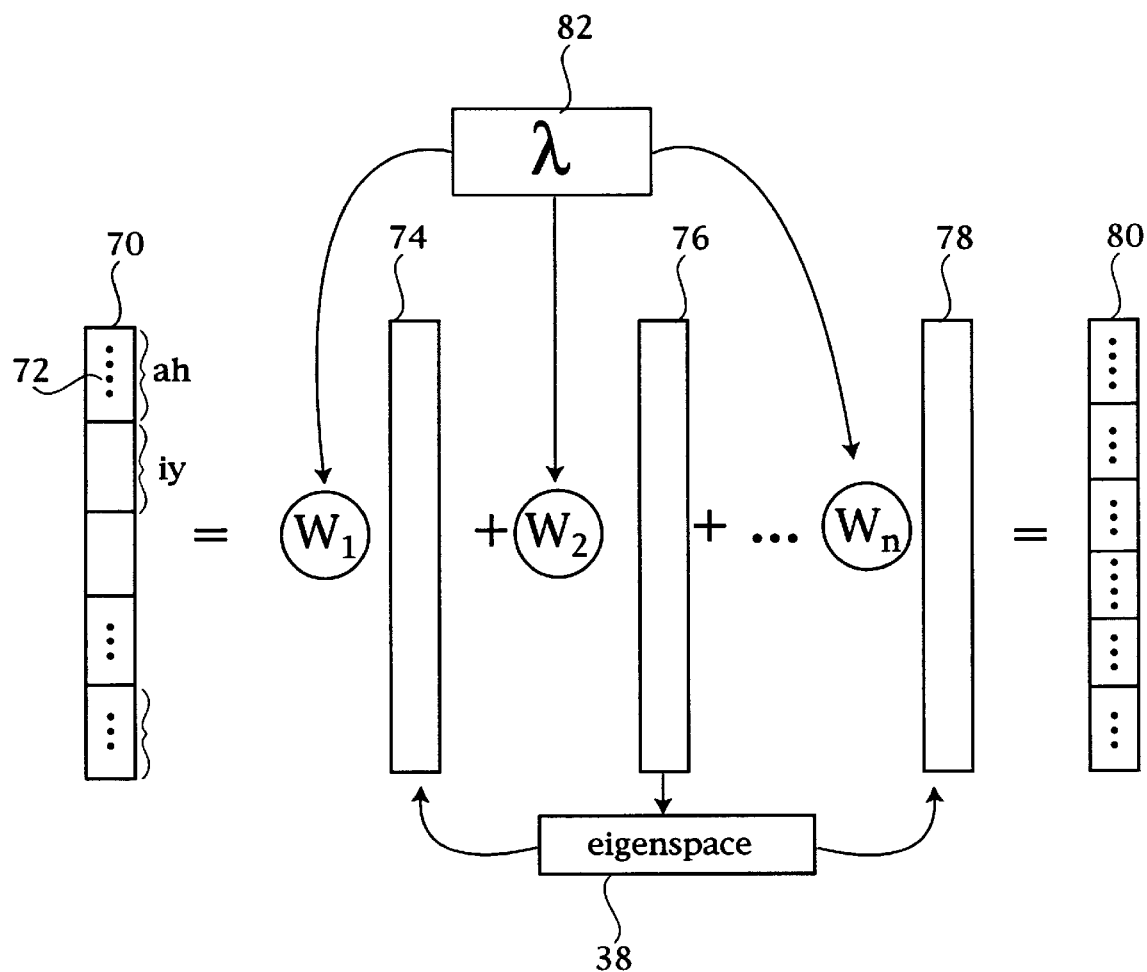
FIG. 5 is an illustration of how the maximum likelihood technique is performed.

FIG. 5 shows how the maximum likelihood technique works. The input speech from the new speaker is used to construct supervector 70. As explained above, the supervector comprises a concatenated list of speech parameters, corresponding to cepstral coefficients or the like. In the illustrated embodiment these parameters are floating point numbers representing the Gaussian means extracted from the set of Hidden Markov Models corresponding to the new speaker. Other HMM parameters may also be used. In the illustration these HMM means are shown as dots, as at 72. When fully populated with data, supervector 70 would contain floating point numbers for each of the HMM means, corresponding to each of the sound units represented by the HMM models. For illustration purposes it is assumed here that the parameters for phoneme "ah" are present but parameters for phoneme "iy" are missing.

The eigenspace 38 is represented by a set of eigenvectors 74, 76 and 78. The supervector 70 corresponding to the observation data from the new speaker may be represented in eigenspace by multiplying each of the eigenvectors by a corresponding eigenvalue, designated $W_1, W_2 \ldots W_n$. These eigenvalues are initially unknown. The maximum likelihood technique finds values for these unknown eigenvalues. As will be more fully explained, these values are selected by seeking the optimal solution that will best represent the new speaker within eigenspace.

After multiplying the eigenvalues with the corresponding eigenvectors of eigenspace 38 and summing the resultant products, an adapted model 80 is produced. Whereas the supervector of the input speech (supervector 70) may have had some missing parameter values (the "iy" parameters, for example), the supervector 80 representing the adapted model is fully populated with values. That is one benefit of the invention. Moreover, the values in supervector 80 represent the optimal solution, namely that which has the maximum likelihood of representing the new speaker in eigenspace.

The individual eigenvalues $W_1, W_2 \ldots W_n$ may be viewed as comprising a maximum likelihood vector, herein referred to as maximum likelihood vector. FIG. 5 illustrates vector diagrammatically at 82. As the illustration shows, maximum likelihood vector 82 comprises the set of eigenvalues $W_1, W_2 \ldots W_n$.

Figure 6:
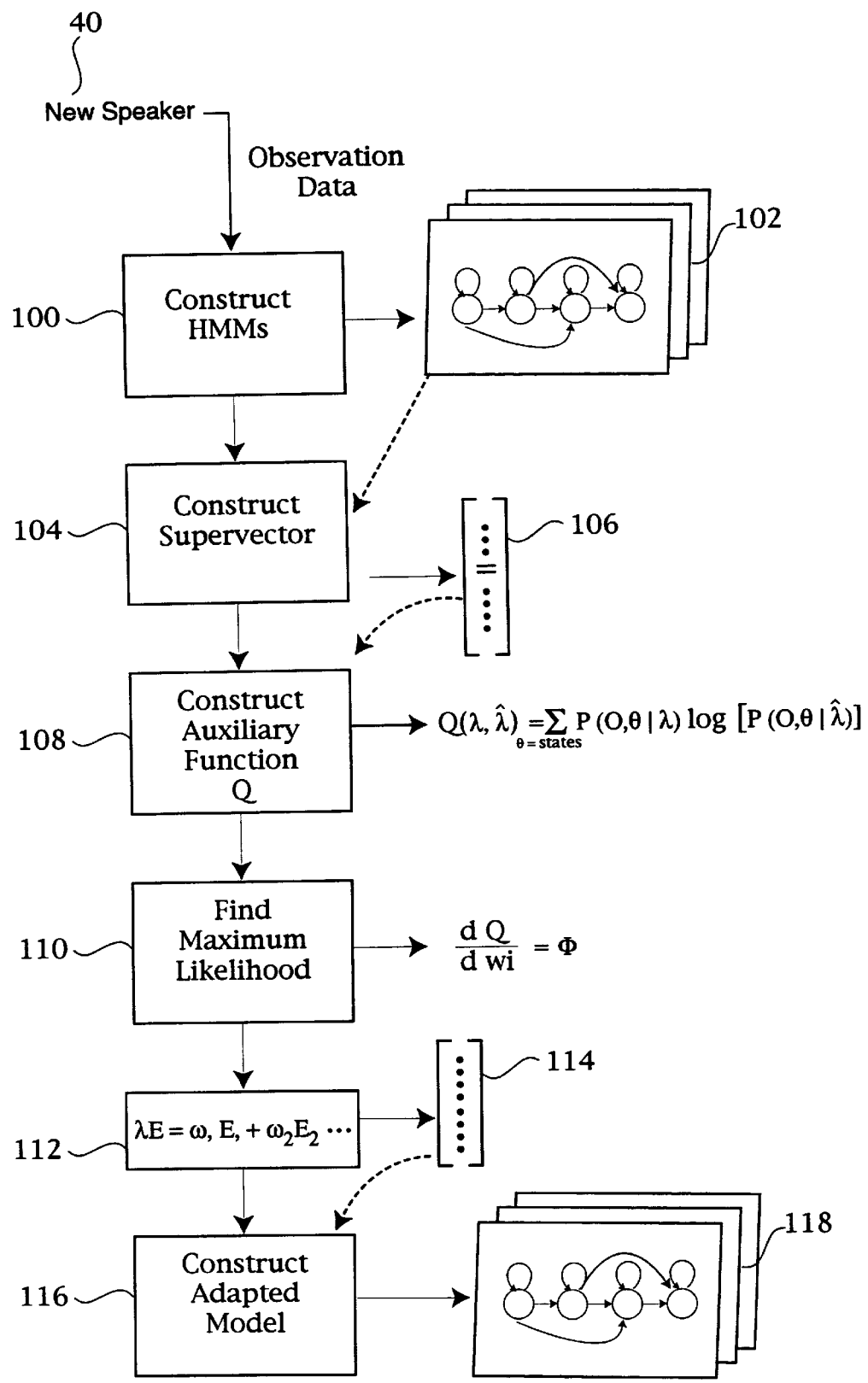
FIG. 6 is a data structure diagram illustrating how the observation data from a speaker may be placed into eigenspace based on the maximum likelihood operation.

The procedure for performing adaptation using the maximum likelihood technique is shown in FIG. 6. Speech from a new speaker, comprising the observation data, is used to construct a set of HMMs as depicted at 100. The set of HMMs 102 is then used in constructing a supervector as depicted at 104. As illustrated, the supervector 106 comprises a concatenated list of HMM parameters extracted from the HMM models 102.

Using the supervector 106, a probability function Q is constructed at 108. The presently preferred embodiment employs a probability function that represents the probability of generating the observed data for the pre-defined set of HMM models 102. Subsequent manipulation of the probability function Q is made easier if the function includes not only a probability term P but also the logarithm of that term, log P.

The probability function is then maximized at step 110 by taking the derivative of the probability function individually with respect to each of the eigenvalues $W_1, W_2 \ldots W_n$. For example, if the eigenspace is of dimension 100, this system calculates 100 derivatives of the probability function Q setting each to zero and solving for the respective W. While this may seem like a large computation, it is far less computationally expensive than performing the thousands of computations typically required of conventional MAP or MLLR techniques.

The resulting set of Ws, so obtained, represent the eigenvalues needed to identify the point in eigenspace corresponding to the point of maximum likelihood. Thus the set of Ws comprises a maximum likelihood vector in eigenspace. In this regard, each of the eigenvectors (eigenvectors 74, 76 and 78 in FIG. 5) define a set of orthogonal vectors or coordinates against which the eigenvalues are multiplied to define a point constrained within eigenspace. This maximum likelihood vector, depicted at 112, is used to construct supervector 114 corresponding to the optimal point in eigenspace (point 66 in FIG. 4). Supervector 114 may then be used at step 116 to construct the adapted model 118 for the new speaker.

In the context of the maximum likelihood framework of the invention, we wish to maximize the likelihood of an observation $O = o_1 \ldots o_T$ with regard to the model $\lambda$. This may be done by iteratively maximizing the auxiliary function Q (below), where $\lambda$ is the current model at the iteration and $\hat{\lambda}$ is the estimated model. We have:

$$Q(\lambda, \hat{\lambda}) = \sum_{\theta \in states} P(O, \theta | \lambda) \log[P(O, \theta | \hat{\lambda})]$$

As a preliminary approximation, we might want to carry out a maximization with regards to the means only. In the context where the probability P is given by a set of HMMs, we obtain the following:

$$Q(\lambda, \hat{\lambda}) = const - \frac{1}{2} P(O | \lambda) \sum_{\substack{states \\ in\ \lambda}} \sum_{\substack{mixt \\ gauss \\ inS}}^{M_s} \sum_{time}^{T} \{\gamma_m^{(s)}(t)[n \log(2\pi) + \log|C_m^{(s)}| + h(o_t, m, s)]\}$$

where: $h(o_t, m, s) = (o_t - \hat{\mu}_m^{(s)})^T C_m^{(s)-1} (o_t - \hat{\mu}_m^{(s)})$ and let:

| | |
|---|---|
| $o_t$ | be the feature vector at time t |
| $C_m^{(s)-1}$ | be the inverse covariance for mixture gaussian m of state s |
| $\hat{\mu}_m^{(s)}$ | be the approximated adapted mean for state s, mixture component m |
| $\gamma_m^{(s)}(t)$ | be the P(using mix gaussian m$|\lambda,o_t$) |

Suppose the gaussian means for the HMMs of the new speaker are located in eigenspace. Let this space be spanned by the mean supervectors $\bar{\mu}_j$ with $j=1 \ldots E$, $$\bar{\mu}_j = \begin{bmatrix} \bar{\mu}_1^{(1)}(j) \\ \bar{\mu}_2^{(1)}(j) \\ \vdots \\ \bar{\mu}_m^{(s)}(j) \\ \bar{\mu}_{M_{S_\lambda}}^{(S_\lambda)}(j) \end{bmatrix}$$

where $\bar{\mu}_m^{(s)}(j)$ represents the mean vector for the mixture gaussian m in the state s of the eigenvector (eigenmodel) j. Then we need:

$$\hat{\mu} = \sum_{j=1}^{E} w_j \bar{\mu}_j$$

The $\bar{\mu}_j$ are orthogonal and the $w_j$ are the eigenvalues of our speaker model. We assume here that any new speaker can be modeled as a linear combination of our database of observed speakers. Then $$\hat{\mu}_m^{(s)} = \sum_{j=1}^{E} w_j \bar{\mu}_m^{(s)}(j)$$

with s in states of $\lambda$, m in mixture gaussians of M.

Since we need to maximize Q, we just need to set $$\frac{\partial Q}{\partial w_e} = 0, \quad e = 1 \ldots E.$$

(Note that because the eigenvectors are orthogonal, $$\frac{\partial w_i}{\partial w_j} = 0, i \neq j \ldots)$$

Hence we have $$\frac{\partial Q}{\partial w_e} = 0 = \sum_{\substack{states \\ in\ \lambda}}^{S_\lambda} \sum_{\substack{mixt \\ gauss \\ inS}}^{M_s} \sum_{time}^{T} \left\{ \frac{\partial}{\partial w_e} \gamma_m^{(s)}(t) h(o_t, s) \right\}, e = 1 \ldots E.$$

Computing the above derivative, we have:

$$0 = \sum_s \sum_m \sum_t \gamma_m^{(s)}(t) \left\{ -\bar{\mu}_m^{(s)T}(e) C_m^{(s)-1} o_t + \sum_{j=1}^{E} w_j \bar{\mu}_m^{(s)T}(j) C_m^{(s)-1} \bar{\mu}_m^{(s)}(e) \right\}$$

from which we find the set of linear equations $$\sum_s \sum_m \sum_t \gamma_m^{(s)}(t) \bar{\mu}_m^{(s)T}(e) C_m^{(s)-1} o_t =$$

$$\sum_s \sum_m \sum_t \gamma_m^{(s)}(t) \sum_{j=1}^{E} w_j \bar{\mu}_m^{(s)T}(j) C_m^{(s)-1} \bar{\mu}_m^{(s)}(e),$$

$$e = 1 \ldots E.$$

Assessing Proximity in Eigenspace

When representing speakers as points in eigenspace, a simple geometric distance calculation can be used to identify which training data speaker is closest to the new speaker. When representing speakers as distributions in eigenspace, proximity is assessed by treating the new speaker data as an observation O and by then testing each distribution candidate (representing the training speakers) to determine what is the probability that the candidate generated the observation data. The candidate with the highest probability is assessed as having the closest proximity. In some high-security applications it may be desirable to reject verification if the most probable candidate has a probability score below a predetermined threshold. A cost function may be used to thus rule out candidates that lack a high degree of certainty.

Assessing the proximity of the new speaker to the training speakers may be carried out entirely within eigenspace, as described above. Alternatively, a Bayesian estimation technique can be used for even greater accuracy.

To enhance the proximity assessment using Bayesian estimation, the Gaussian densities of the training speakers within eigenspace are multiplied by the estimated marginal density in the orthogonal complement space that represents the speaker data that were discarded through dimensionality reduction. In this regard, recognize that performing dimensionality reduction upon the speaker model supervectors results in a significant data compression from high-dimensionality space to low-dimensionality space. Although dimensionality reduction preserves the most important basis vectors, some higher-order information is discarded. The Bayesian estimation technique estimates a marginal Gaussian density that corresponds to this discarded information.

To illustrate, assume that the original eigenspace is constructed by linear transformation of the supervector through a dimensionality reduction process whereby M components are extracted from the larger number N of all components. The smaller extracted M components represent a lower-dimensional subspace of the transformation basis that correspond to the maximal eigenvalues. Thus the eigenspace is defined by components i=1 . . . M, whereas the discarded minor components correspond to i=M+1 . . . N. These two sets of components define two mutually exclusive and complementary subspaces, the principal subspace represents the eigenspace of interest and its orthogonal component represents the data that were discarded through dimensionality reduction.

We can compute the likelihood estimate as the product of the Gaussian densities in these two respective orthogonal spaces by the following equation:

$$\hat{P}(x|\Omega) = P_E(x|\Omega) * P_{\bar{E}}(x|\Omega)$$

In the above equation, the first term is the single Gaussian density in eigenspace E and the second term is the single Gaussian distribution in the space orthogonal to the eigenspace. It turns out that both terms can be estimated entirely from the set of training data vectors, using only the projections into eigenspace and the residuals.

What is claimed is:

1. A method for assessing speech with respect to a predetermined client speaker, comprising:

training a set of speech models upon the speech from a plurality of training speakers, the plurality of training speakers including at least one client speaker;

constructing an eigenspace to represent said plurality of training speakers by performing dimensionality reduction upon said set of models to generate a set of basis vectors that define said eigenspace;

representing said client speaker as a first location in said eigenspace;

processing new speaker input data by training a new speech model upon said input data and by performing dimensionality reduction upon said new speech model to generate a representation of said new speaker as a second location in eigenspace;

assessing the proximity between said first and second locations and using said assessment as an indication of whether the new speaker is the client speaker.

2. A speaker identification method according claim 1 wherein said plurality of training speakers includes a plurality of different client speakers and wherein said method further comprises:

representing each of said plurality of client speakers as training speaker locations in said eigenspace, and assessing the proximity between said second location and said training speaker locations and identifying said new speaker as a selected one of said plurality of client speakers based at least in part on said proximity assessment.

3. A speaker verification method according to claim 1 wherein said plurality of training speakers includes at least one impostor speaker that is represented as a third location in eigenspace.

4. A speaker verification method according to claim 3 further comprising additionally assessing the proximity between said second and third locations and using said additional assessment as a further indication of whether the new speaker is the client speaker.

5. The method of claim 1 wherein said step of assessing proximity is performed by determining the distance between said first and second locations.

6. The method of claim 1 wherein said training speakers are represented as locations in said eigenspace.

7. The method of claim 1 wherein said training speakers are represented as points in said eigenspace.

8. The method of claim 1 wherein said training speakers are represented as distributions in said eigenspace.

9. The method of claim 1 wherein said step of processing new speaker input data includes using said input data to generate a probability function and then maximizing said probability function to determine a maximum likelihood vector that lies within said eigenspace.

10. The method of claim 1 wherein said plurality of training speakers includes a plurality of client speakers and at least one impostor speaker.

11. The method of claim 1 further comprising periodically assessing the proximity between said first and second locations and using said assessment as an indication of whether the new speaker is the client speaker to determine if the identity of said new speaker changes.

* * * * *